Oct. 27, 1964   D. C. WORLTON ETAL   3,153,850
METHOD AND DEVICE FOR CONTROLLING ULTRASONIC WELDING APPARATUS
Filed July 18, 1962
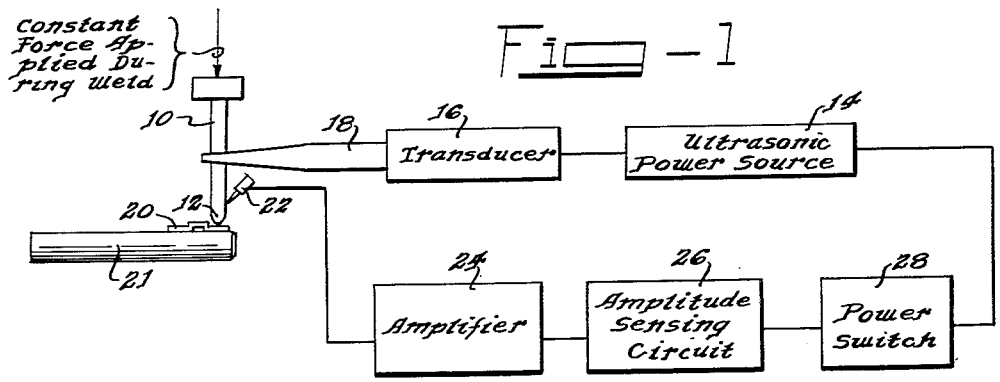
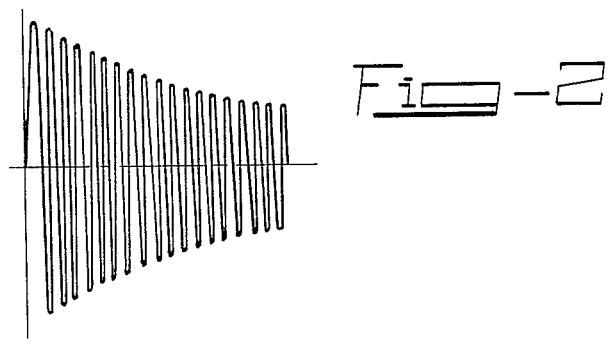
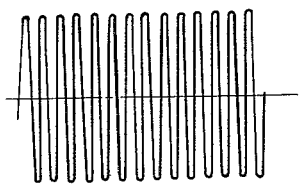
INVENTORS
Daniel C. Worlton
Ray A. Walker
BY
Roland A. Anderson
Attorney

3,153,850
METHOD AND DEVICE FOR CONTROLLING ULTRASONIC WELDING APPARATUS
Daniel C. Worlton, Richland, and Ray A. Walker, Pasco, Wash., assignors to the United States of America as represented by the United States Atomic Energy Commission
Filed July 18, 1962, Ser. No. 210,863
4 Claims. (Cl. 29—470)

This invention relates generally to ultrasonic welding and more specifically to a method of automatically insuring the quality of ultrasonic welds.

Ultrasonic welding involves the joining of two metal surfaces by a process which vibrates the two surfaces in shear at some optimum ultrasonic frequency. Shear vibration is applied through a specially designed welding tip which exerts force as well as ultrasonic energy on the two surfaces to be joined. Of importance to the attainment of good welds is the weld time, and, due to various inconsistencies that may be present, it would be desirable if an automatic device were available to properly control the weld time. Such inconsistencies include factors such as frequency variation, changes in the force applied or energy introduced to the junction to be welded, differences in the condition of the surfaces of the metals to be joined, and other variations that would effect the time required for a proper weld.

It is, therefore, an object of this invention to provide a method for controlling the quality of ultrasonic welds.

It is another object of this invention to provide a method whereby the quality of ultrasonic welds may be automatically controlled by insuring that the proper weld time is utilized in the welding operation.

It is still another object of this invention to provide an apparatus for implementing the objectives set forth in the aforementioned methods.

Other objectives will become apparent as the detailed description proceeds.

In general, this invention utilizes the phenomenon exhibited by metallic bodies whereby such bodies present an acoustical impedance to elastic waves set up therein, such impedance being dependent upon the physical characteristics of the material involved. We have found that, in ultrasonic welding, the acoustical impedance of the metals to be welded exhibits a pronounced change when a bond of good quality is formed. The teachings of this invention, therefore, employ means for obtaining a measure of this impedance change for controlling the welding process in accordance therewith.

Along with the description to follow a more complete understanding of the invention will be obtained from consideration of the accompanying drawings in which:

FIG. 1 is a block diagram of a conventional ultrasonic welding device incorporating the improvements of the present invention;

FIG. 2 is a plot of welding head displacement versus weld time for a good ultrasonic weld; and FIG. 3 is a plot of welding head displacement versus weld time for a poor ultrasonic weld.

Referring to FIG. 1, it can be seen that the ultrasonic welding apparatus comprises a welding head 10 having a welding tip 12, and an ultrasonic frequency electrical power source 14 which supplies ultrasonic energy to welding head 10 through an electromechanical transducer 16 and a coupling horn 18. The transducer 16 and a horn 18 cooperate to cause the tip 12 of welding head 10 to vibrate, the displacement of the tip 12 of head 10 being in a plane substantially normal to the axis thereof. A constant external force is applied as shown to the top of the welding head. Welding tip 12 operates on a workpiece 20 which is to be spot welded to body 21.

In contact with welding head 10 near tip 12 is a conventional pickup cartridge 22 which is connected to an amplifier 24, amplitude sensing circuit 26, and power switch 28. Pickup cartridge 22 produces an instantaneous output current corresponding to the instantaneous displacement of welding head 10 in a plane substantially perpendicular to the axis thereo.

Reference is now made to FIG. 2 in which a plot of head displacement versus weld time for a good weld is shown, and to FIG. 3 where a similar plot for a poor weld is shown. It can be seen by comparison of these two diagrams that the displacement of the welding head is damped when a proper weld is formed. In FIG. 2 the instantaneous displacement decreases as weld time increases, suggesting that the acoustic impedance of the junction rises during formation of the weld.

Referring now to the operation of the device shown in FIG. 1, it can be seen that electrical energy of ultrasonic frequency from source 14 is converted by electromechanical transducer 16 into mechanical vibrations which are coupled to welding head 10 by the coupling horn 18. Such apparatus is conventional in the ultrasonic welding art. Welding head 10 being thus excited by ultrasonic energy, the tip 12 is then applied to workpiece 20 under force.

When a proper bond is obtained, the instantaneous displacement of head 10 is damped, as shown in FIG. 2. This displacement is constantly monitored during the welding process by the pickup cartridge 22 which serves as an electromechanical transducer to convert the displacement of head 10 into an electrical wave plot. Pickup cartridge 22 may be a conventional phonograph pickup cartridge. The output of cartridge 22 is amplified by amplifier 24 and sent to the amplitude sensing circuit 26 which senses when the amplitude of the signal has decreased to a predetermined value. The decrease to this value represents the forming of a proper weld bond, the value being chosen according to the physical characteristics of the materials being welded and the initial displacement of the welding head.

When amplitude sensing circuit 26 senses a displacement decrease to a predetermined value as aforesaid, it is then no longer desirable or necessary that the welding operation be continued. Therefore, circuit 26 actuates power switch 28 to shut off the power source 14 and terminate the welding process. It should be appreciated that amplifier 24, sensing circuit 26, and power switch 28 and their interconnection are conventional apparatus and involve techniques well within the capabilities of those with ordinary skill in the art.

It is to be understood that the device shown in FIG. 1 illustrates an apparatus which may be used to implement a novel method of insuring proper weld time in ultrasonic welding. This operation could be performed by hand by an operator observing the trace of the welding head displacement on an oscilloscope and actuating the power source manually, if the particular welding process did not take such a short time that human responses would be too slow. Furthermore, it is apparent that the change in welding head displacement will be reflected back to the electrical side of the transducer 16 and that the current drawn from the power source 14 will decrease in proportion to the decrease in welding head displacement. This dual effect makes it especially evident that persons skilled in the art may readily adapt the general teachings of the invention to embodiments other than the specific embodiment illustrated. For example the decrease in the current drawn from power source 14 could be monitored and used as an indication of a good weld instead of the output from pickup cartridge 22, if desired.

Accordingly, the scope of the protection afforded the

What is claimed is:

1. In an ultrasonic welding device having a welding head for applying force and ultrasonic energy to a workpiece, the combination with the welding head of means responsive to the welding head for producing an electrical signal proportional to the instantaneous amplitude of the displacement of the head in a plane substantially perpendicular to the axis thereof and means responsive to a decrease in the instantaneous amplitude of said electrical signal to a predetermined value for stopping the welding process.

2. In an ultrasonic welding device having a welding head for applying force and ultrasonic energy to a workpiece and means that may be actuated to shut off the operation of the device, the combination with the welding head and shutoff means of a transducer coupled to the head for producing an electrical signal proportional to the instantaneous amplitude of the displacement of the head in a plane substantially perpendicular to the axis thereof and means responsive to a decrease in the instantaneous amplitude of said electrical signal to a predetermined value for actuating the shutoff means.

3. The device according to claim 2, wherein the transducer is a pickup cartridge placed on the welding head near the welding tip.

4. In a method of ultrasonic welding comprising exciting a welding head with ultrasonic vibrations and applying under force the welding tip thereof to a workpiece, the method of insuring the quality of the weld comprising obtaining a measure of the instantaneous amplitude of the displacement of the welding head in a plane substantially perpendicular to the axis thereof during the welding operation and discontinuing the welding operation when said amplitude decreases to a predetermined value.

References Cited in the file of this patent

UNITED STATES PATENTS

| | | |
|---|---|---|
| 2,235,928 | Hardinge | Mar. 25, 1941 |
| 3,056,192 | Jones | Oct. 2, 1962 |